US012738400B2

(12) United States Patent
Ueda et al.

(10) Patent No.: US 12,738,400 B2
(45) Date of Patent: Sep. 15, 2026

(54) FADER DEVICE

(71) Applicant: YAMAHA CORPORATION, Hamamatsu (JP)

(72) Inventors: Taku Ueda, Toyohashi (JP); Hisanobu Suzuki, Hamamatsu (JP); Hisashi Nagai, Hamamatsu (JP); Kazuhiko Nishizawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 550 days.

(21) Appl. No.: 18/353,475

(22) Filed: Jul. 17, 2023

(65) Prior Publication Data

US 2023/0360826 A1 Nov. 9, 2023

Related U.S. Application Data

(63) Continuation of application No. PCT/JP2021/034344, filed on Sep. 17, 2021.

(30) Foreign Application Priority Data

Jan. 25, 2021 (JP) ................................ 2021-009488

(51) Int. Cl.
*H01C 10/40* (2006.01)

(52) U.S. Cl.
CPC .................................. *H01C 10/40* (2013.01)

(58) Field of Classification Search
CPC ......... H01C 10/40; H01C 10/42; F16H 25/20; F16H 2025/2031; F16H 2025/204
See application file for complete search history.

(56) References Cited

U.S. PATENT DOCUMENTS 2,780,776 A * 2/1957 Goeppinger ........... G01R 27/02 324/705
4,489,248 A * 12/1984 Petersen .................. H02K 7/06 310/83
4,583,032 A * 4/1986 Nunziata ................ G01D 5/165 338/176
5,234,386 A * 8/1993 Nagai ...................... B23Q 1/56 474/148

(Continued)

FOREIGN PATENT DOCUMENTS

JP S4018534 B1 8/1965
JP S5587402 A 7/1980

(Continued)

OTHER PUBLICATIONS

JP-S6179063 machine translation (Year: 1986).*

(Continued)

*Primary Examiner* — Kyung S Lee
(74) *Attorney, Agent, or Firm* — ROSSI, KIMMS & McDOWELL LLP

(57) ABSTRACT

A fader device includes a plurality of shafts disposed parallel to each other, and a moving body attached to the plurality of shafts and movable in a longitudinal direction of the plurality of shafts. At least one of the plurality of shafts is a screw shaft with a male thread on an outer periphery thereof and is configured to be rotatable about an axis extending along the longitudinal direction. At least one of the plurality of shafts other than the screw shaft is a guide shaft that guides the moving body in the longitudinal direction. The moving body meshes with the male thread to move in the longitudinal direction as the screw shaft rotates.

5 Claims, 10 Drawing Sheets

(56) References Cited

U.S. PATENT DOCUMENTS

| | | | | |
|---|---|---|---|---|
| 6,848,327 | B2 * | 2/2005 | Nagai | F16C 29/063<br>74/89.33 |
| 2001/0015581 | A1 * | 8/2001 | Sato | H02K 7/06<br>310/91 |
| 2008/0224994 | A1 | 9/2008 | Kato | |
| 2012/0260755 | A1 * | 10/2012 | Asher | F16C 29/0692<br>74/89.32 |
| 2020/0067619 | A1 | 2/2020 | Ueda et al. | |

FOREIGN PATENT DOCUMENTS

| | | | |
|---|---|---|---|
| JP | S6011407 | U | 1/1985 |
| JP | S6179063 | * | 4/1986 |
| JP | H0679105 | U | 11/1994 |
| JP | H09171910 | A | 6/1997 |
| JP | 2008227065 | A | 9/2008 |
| JP | 2012207751 | * | 10/2012 |
| JP | 2016100371 | A | 5/2016 |
| JP | 2020031143 | A | 2/2020 |

OTHER PUBLICATIONS

JP-2012207751 machine translation (Year: 2012).*
Partial Supplementary European Search Report issued in European Appln. No. 21921146.3, mailed Nov. 22, 2024.
International Search Report issued in Intl. Appln. No. PCT/JP2021/034344 mailed Nov. 30, 2021. English translation provided.
Written Opinion issued in Intl. Appln. No. PCT/JP2021/034344 mailed Nov. 30, 2021.
Office Action issued in Japanese Appln. No. 2021-193068 mailed Dec. 7, 2021. English machine translation provided.
Office Action issued in Japanese Appln. No. 2021-558594 mailed Oct. 26, 2021. English machine translation provided.
Office Action issued in Japanese Appln. No. 2021-558594 mailed Dec. 7, 2021. English machine translation provided.
English translation of Written Opinion issued in Intl. Appln. No. PCT/JP2021/034344, mailed on Nov. 30, 2021, previously cited in IDS filed Jul. 17, 2023.
Extended European search report issued in European Appln. No. 21921146.3, mailed on Feb. 12, 2025.

* cited by examiner

FADER DEVICE

CROSS-REFERENCE TO RELATED APPLICATIONS

The present application is a continuation application of International Application No. PCT/JP2021/034344, filed Sep. 17, 2021, which claims priority to Japanese Patent Application No. 2021-009488, filed Jan. 25, 2021. The contents of these applications are incorporated herein by reference.

BACKGROUND OF THE INVENTION

Field of the Invention

The present disclosure relates to a fader device.

Description of Related Art

Japanese Unexamined Patent Application, First Publication No. H09-171910 (hereinafter Patent Document 1) discloses a fader device having a moving body that can move in a linear direction. A fader device adjusts various parameter values (for example, volume of sound collected by a microphone, illuminance of lighting, and the like) by moving a moving body. In the fader device of Patent Document 1, a moving body is attached to a portion of an endless belt wound around a plurality of pulleys in the circumferential direction.

SUMMARY OF THE INVENTION

In this type of fader device, it is conceivable for the moving body to be moved by the driving force of a motor in response to a control signal input from the outside. For example, in the fader device of Patent Document 1, a single pulley may be rotationally driven by the driving force of a motor. Thereby, the moving body can be moved by transmitting the driving force of the motor to the moving body via the pulley and the endless belt.

In order to transmit the driving force of the motor to the moving body, the tension (tensile force) applied to the endless belt should be large. However, if the tension acting on the endless belt is large, the resistance when manually moving the moving body increases, making it difficult to move the moving body finely and thus impairing the operational feeling of the moving body. On the other hand, if the tension applied to the endless belt is reduced in order to facilitate manual movement of the moving body, the pulley rotationally driven by the motor tends to slip relative to the endless belt, or the teeth tend to skip. For this reason, it becomes difficult to move the moving body with high precision by the motor.

In addition, it is difficult to precisely adjust the tension applied to the endless belt so as not to impair the operational feeling of the moving body and to prevent the pulley from slipping on the endless belt or tooth jumping. Moreover, since the properties of an endless belt (for example, hardness and length) are easily affected by temperature and humidity, the tension acting on the endless belt is likely to change.

The present disclosure has been achieved in view of the above circumstances and an object thereof is to provide a fader device capable of accurately moving a moving body by means of a motor while improving the operational feeling of the moving body.

A first aspect of the present disclosure is a fader device including: a plurality of shafts disposed parallel to each other; and a moving body attached to the plurality of shafts and movable in a longitudinal direction of the plurality of shafts. At least one of the plurality of shafts is a screw shaft with a male thread on an outer periphery thereof and being configured to be rotatable about an axis extending along the longitudinal direction. At least one of the plurality of shafts other than the screw shaft is a guide shaft that guides the moving body in the longitudinal direction. The moving body meshes with the male thread to move in the longitudinal direction as the screw shaft rotates.

A second aspect of the present disclosure is a fader device including: a screw shaft extending in a linear direction and including a thread, the screw shaft being rotatable about an axis extending in the linear direction; a guide member extending in the linear direction and disposed parallel to the screw shaft; and a moving body attached to the screw shaft and the guide member and movable in the linear direction; wherein the moving body meshes with the thread to move in the linear direction as the screw shaft rotates.

A third aspect of the present disclosure is a fader device including: a screw shaft extending in a linear direction and including a male thread on an outer periphery thereof, the screw shaft being rotatable about an axis extending in the linear direction; a moving body attached to the screw shaft and meshes with the male thread to move in the linear direction as the screw shaft rotates; a partition member that separates a first region where the screw shaft is located from a second region that is different from the first region, the partition member including a slot that extends in the linear direction and through which part of the moving body extends through from a side of the first region to a side of the second region; and a cover member positioned between the screw shaft and the slot of the partition member in the first region and extending in the linear direction.

EMBODIMENTS FOR CARRYING OUT THE INVENTION

First Embodiment

A first embodiment of the present disclosure will be described below with reference to FIGS. 1 to 3.

Figure 1:
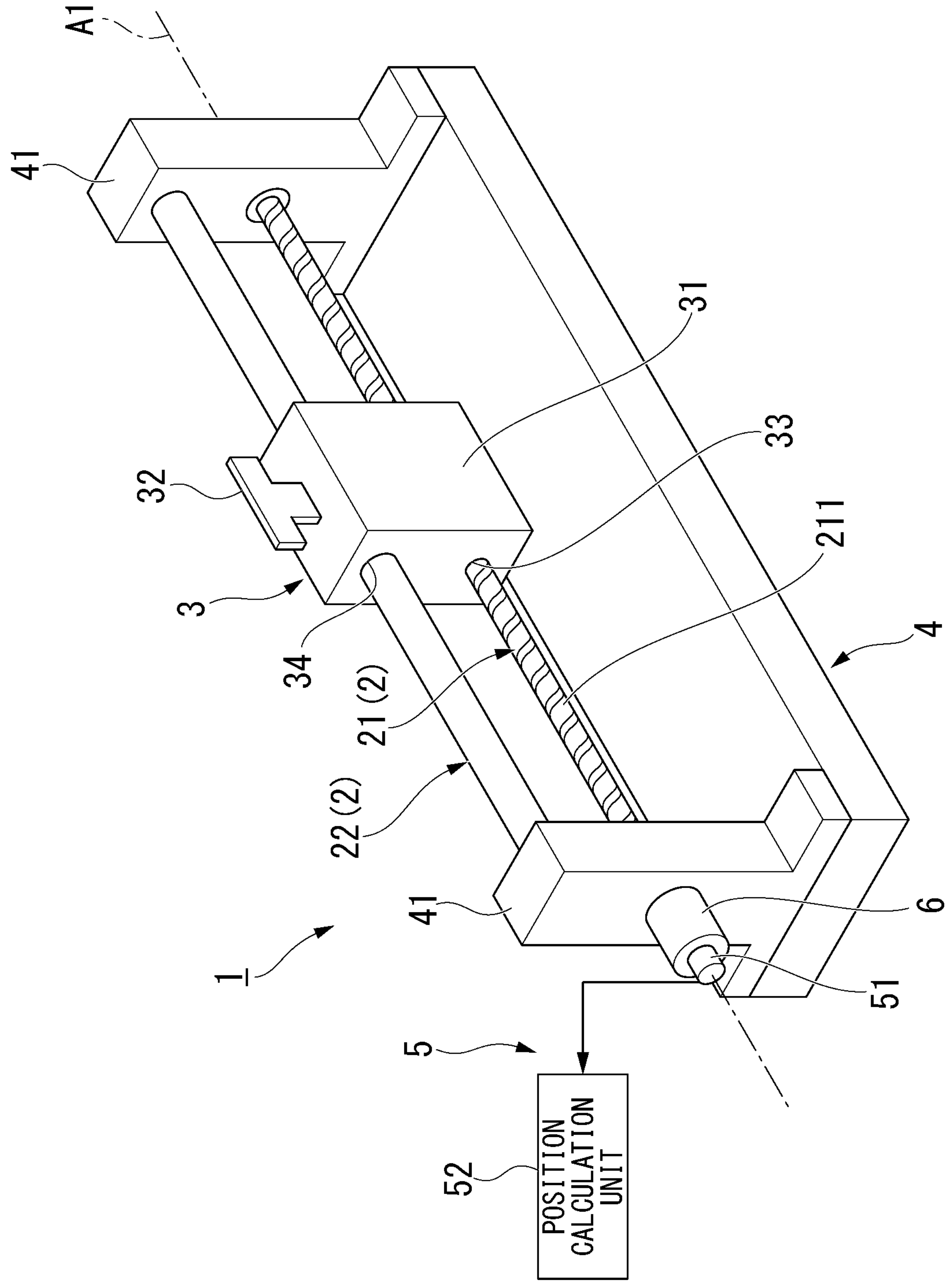
FIG. 1 is a perspective view showing a fader device according to the first embodiment of the present disclosure.

As shown in FIG. 1, a fader device 1 according to the first embodiment includes a plurality of shafts 2 and a moving body 3. The fader device 1 also includes a base 4.

The plurality of shafts 2 are each formed in a rod shape extending in a straight line direction. The plurality of shafts 2 are arranged parallel to each other. Further, the plurality of shafts 2 are spaced apart from each other when viewed in the longitudinal direction of the shafts 2 (see FIG. 2). In the present embodiment, the plurality of shafts 2 are arranged spaced apart in a row in a direction perpendicular to the longitudinal direction of the shafts 2.

Both end portions of the plurality of shafts 2 in the longitudinal direction are supported by the base 4. The base 4 has a pair of support portions 41 spaced apart in the longitudinal direction of the shafts 2. Both end portions of the shafts 2 in the longitudinal direction are inserted or passed through the pair of support portions 41. The plurality of shafts 2 are thereby supported by the base 4. The base 4 including the pair of support portions 41 may be configured by, for example, a housing (case) that accommodates the plurality of shafts 2 and a main body portion 31 of the moving body 3 to be described later.

The number of shafts 2 in the present embodiment is two.

One of the two shafts 2 is a screw shaft 21. The screw shaft 21 has a male thread 211 on the outer circumference thereof. The male thread 211 may be a single thread or a multi-threaded thread. The screw shaft 21 is rotatable around an axis A1 extending in the longitudinal direction of the shafts 2. In the present embodiment, the pair of support portions 41 that support both end portions in the longitudinal direction of the screw shaft 21 function as bearings that rotatably support the screw shaft 21.

The other one of the two shafts 2 is a guide shaft 22 (guide member). The guide shaft 22 is configured to guide the moving body 3, to be described later, in the longitudinal direction of the shafts 2. The guide shaft 22 also serves to prevent the moving body 3 from rattling with respect to the screw shaft 21 and the base 4 in the direction orthogonal to the longitudinal direction of the shafts 2. The guide shaft 22 is formed in a rod-like shape with no irregularities such as the male thread 211 on the outer circumference thereof. The guide shaft 22 may be formed in, for example, a polygonal prismatic shape, but is formed in a columnar shape in this embodiment.

Figure 2:
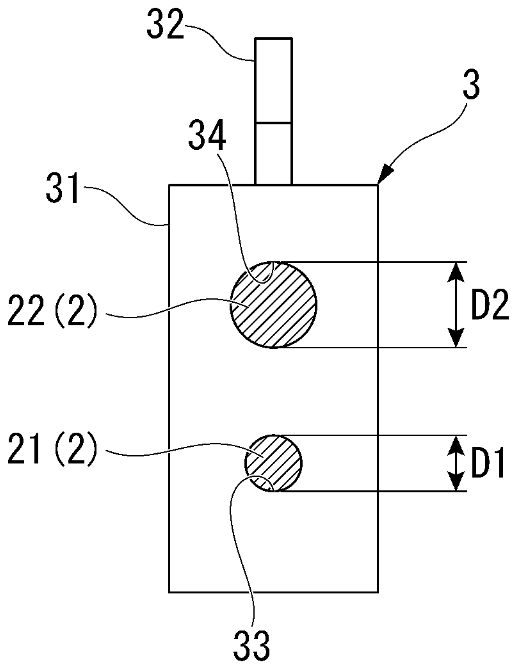
FIG. 2 is a sectional view showing the relationship between the screw shaft, the guide shaft and the moving body in the fader device of FIG. 1.

As shown in FIG. 2, the diameter D2 of the guide shaft 22 is larger than the diameter D1 of the screw shaft 21. Note that the diameter D2 of the guide shaft 22 may be substantially equal to the diameter D1 of the screw shaft 21, for example.

As shown in FIG. 1, the moving body 3 is attached to the plurality of shafts 2 so as to be movable in the longitudinal direction of the shafts 2 with respect to the plurality of shafts 2. The moving body 3 of the present embodiment has a main body portion 31 and an operation portion 32 extending from the main body portion 31. The main body portion 31 is formed with a plurality of through holes 33 and 34 through which the plurality of shafts 2 are individually inserted. The number of through holes 33, 34 corresponds to the number of shafts 2. The plurality of through holes 33, 34 are parallel to each other. As a result, the moving body 3 can move in the longitudinal direction with respect to the plurality of shafts 2. The plurality of through holes 33 and 34 include a first through hole (space) 33 through which the screw shaft 21 is inserted and a second through hole 34 through which the guide shaft 22 is inserted.

The moving body 3 is configured to mesh with the male thread 211 of the screw shaft 21 so as to move in the longitudinal direction of the shafts 2 as the screw shaft 21 rotates, by meshing with the male thread 211 of the screw shaft 21.

Figure 3:
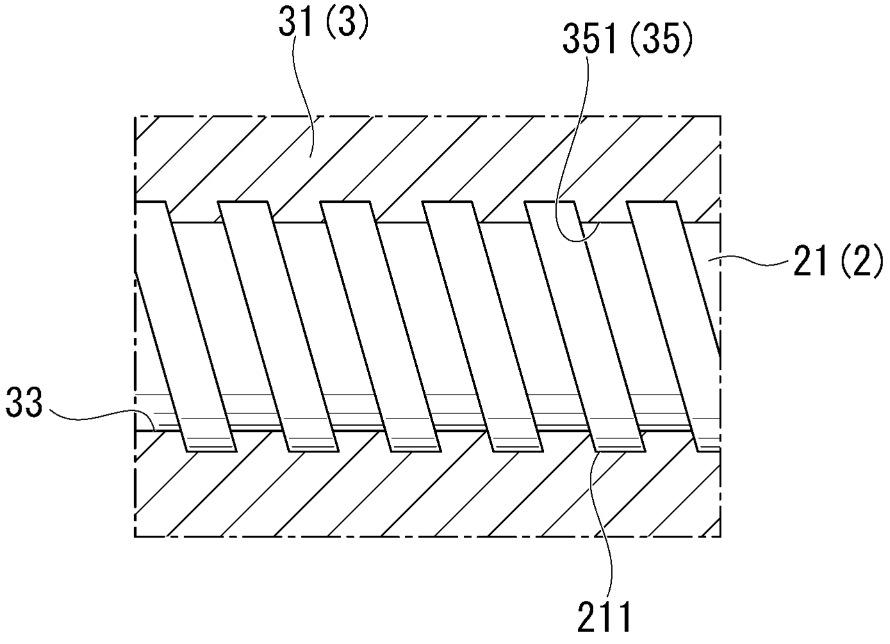
FIG. 3 is a diagram schematically showing the relationship between the male thread of the screw shaft and the female thread of the moving body in the fader device of FIG. 1.

As shown in FIG. 3, the moving body 3 has an engaging portion 35 that engages the male thread 211 of the screw shaft 21. The engaging portion 35 is provided on the inner periphery of the first through hole 33 of the moving body 3 through which the screw shaft 21 is inserted. The engaging portion 35 of this embodiment is a female thread 351 formed on the inner circumference of the first through hole 33 of the moving body 3. Female thread 351 may be a single thread or a multiple-threaded thread corresponding to male thread 211.

The female thread 351 of the main body 31 meshes with the male thread 211 of the screw shaft 21, so that the moving body 3 can move in the longitudinal direction of the shafts 2 (horizontal direction in FIG. 3) as the screw shaft 21 rotates. As shown in FIGS. 1 and 2, since the moving body 3 is also supported by the guide shaft 22 separate from the screw shaft 21, so that even if the screw shaft 21 rotates, the moving body 3 is prevented from rotating with the screw shaft 21 around the axis A1.

The operation portion 32 of the moving body 3 is a part that the operator touches with fingers to move the moving body 3 manually. The operating portion 32 extends in a direction perpendicular to the longitudinal direction of the shafts 2 with respect to the main body portion 31. In the present embodiment, the operating portion 32, the screw shaft 21, and the guide shaft 22 are arranged in a row in a direction orthogonal to the longitudinal direction of the shafts 2 (vertical direction in FIG. 2).

As shown in FIG. 1, the fader device 1 of the present embodiment further includes a position measuring unit 5 that measures the position of the moving body 3 in the longitudinal direction of the shaft 2. The position measuring unit 5 of the present embodiment includes an encoder 51. A shaft (not shown) of the encoder 51 is coupled to the screw shaft 21. The encoder 51 measures the rotation angle of the screw shaft 21.

The position measuring unit 5 further includes a position calculation unit 52. The position calculation unit 52 calculates the position of the moving body 3 in the longitudinal direction of the shafts 2 based on the rotation angle of the screw shaft 21 measured by the encoder 51. Thereby, the position of the moving body 3 in the longitudinal direction of the shafts 2 can be measured.

The fader device 1 of the present embodiment further includes a motor 6 that rotationally drives the screw shaft 21. A drive shaft (not shown) of the motor 6 is coupled to the screw shaft 21. The motor 6 may be, for example, a stepping motor capable of positioning the moving body 3 with high accuracy. In FIG. 1, the motor 6 is arranged between the screw shaft 21 and the encoder 51. For this reason, the shaft of the encoder 51 is coupled to the screw shaft 21 via the drive shaft of the motor 6.

As described above, in the fader device 1 of the present embodiment, the moving body 3 can be moved in the longitudinal direction of the shafts 2 by rotationally driving the screw shaft 21 with the driving force of the motor 6. On the other hand, when the operator grasps the operation portion 32 and manually moves the moving body 3 in the longitudinal direction of the shafts 2, the screw shaft 21 rotates.

Thus, the structure in which the screw shaft 21 rotates with the movement of the moving body 3 can reduce the resistance when the operator moves the moving body 3 manually (resistance to the movement of the moving body 3), compared to the conventional structure in which an endless belt wound around a plurality of pulleys moves as the moving body 3 moves. Thereby, the operational feeling of the moving body 3 can be improved.

Further, in the fader device 1 of the present embodiment, the moving body 3 meshes with the male thread 211 of the screw shaft 21. For that reason, the moving body 3 does not slip on the screw shaft 21 and there is no skipping of teeth. That is, it becomes possible to move the moving body 3 with high accuracy by the motor 6.

Further, the fader device 1 of the present embodiment eliminates the need for strict adjustment of tension in the conventional structure that utilizes an endless belt. Therefore, it is possible to reduce the number of man-hours for manufacturing the fader device 1 and to keep manufacturing costs low.

Further, in the fader device 1 of the present embodiment, the diameter D1 of the screw shaft 21 is smaller than the diameter D2 of the guide shaft 22. Since the screw shaft 21 is thin, the friction generated between the screw shaft 21 and the moving body 3 can be kept small. As a result, the resistance when the operator manually moves the moving body 3 can be further reduced, and the operational feeling of the moving body 3 can be further improved.

The fader device 1 of the present embodiment also has only two shafts 2 attached to the moving body 3. By attaching the moving body 3 to these two shafts 2, the orientation of the moving body 3 can be maintained so that the moving body 3 does not rotate around the shafts 2. One of the two shafts 2 is a screw shaft 21 for moving the moving body in the longitudinal direction of the shafts 2. Therefore, compared with the conventional structure using an endless belt, there is no need to separately provide a component for moving the moving body 3 by the motor 6, and so the number of constituent parts of the fader device 1 can be reduced.

Further, in the fader device 1 of the present embodiment, the position measuring unit 5 that measures the position of the moving body 3 in the longitudinal direction of the shaft 2 has an encoder 51 that measures the rotation angle of the screw shaft 21. Thereby, the length of travel of the moving body 3 in the longitudinal direction of the shafts 2 can be calculated based on the rotation angle of the screw shaft 21 measured by the encoder 51. Therefore, the position of the moving body 3 can be measured.

Further, as described above, since the moving body 3 does not slip on the screw shaft 21 and there is no skipping of teeth, the position of the moving body 3 can be measured by the position measuring unit 5 with high accuracy.

In addition, the encoder 51 used as the position measuring unit 5 can reduce the number of parts constituting the position measuring unit 5 and achieve space savings of the position measuring unit 5 compared to a structure that directly measures the position of the moving body 3 that linearly moves. As a result, the size of the fader device 1 can be easily reduced.

In the first embodiment, the operation portion 32, the screw shaft 21, and the guide shaft 22 are arranged in a row in a direction perpendicular to the longitudinal direction of the shafts 2 (vertical direction in FIG. 2), but it is not limited thereto. For example, the direction in which the screw shaft 21 and the guide shaft 22 are aligned may be orthogonal (left-right direction in FIG. 2) to the direction in which the operation portion 32 and the shaft 2 (screw shaft 21 or guide shaft 22) are aligned (vertical in FIG. 2). However, in this case, since the dimensions (width dimension) of the fader device 1 in the left-right direction are larger, it is more preferable to have the operation portion 32, screw shaft 21, and guide shaft 22 arranged in a row in the vertical direction, as illustrated in FIG. 2.

Second Embodiment

Next, a second embodiment of the present disclosure will be described with reference to FIGS. 4 and 5. In the following description, the same reference numerals are given to the same configurations as those already described, and redundant descriptions will be omitted.

Figure 4:
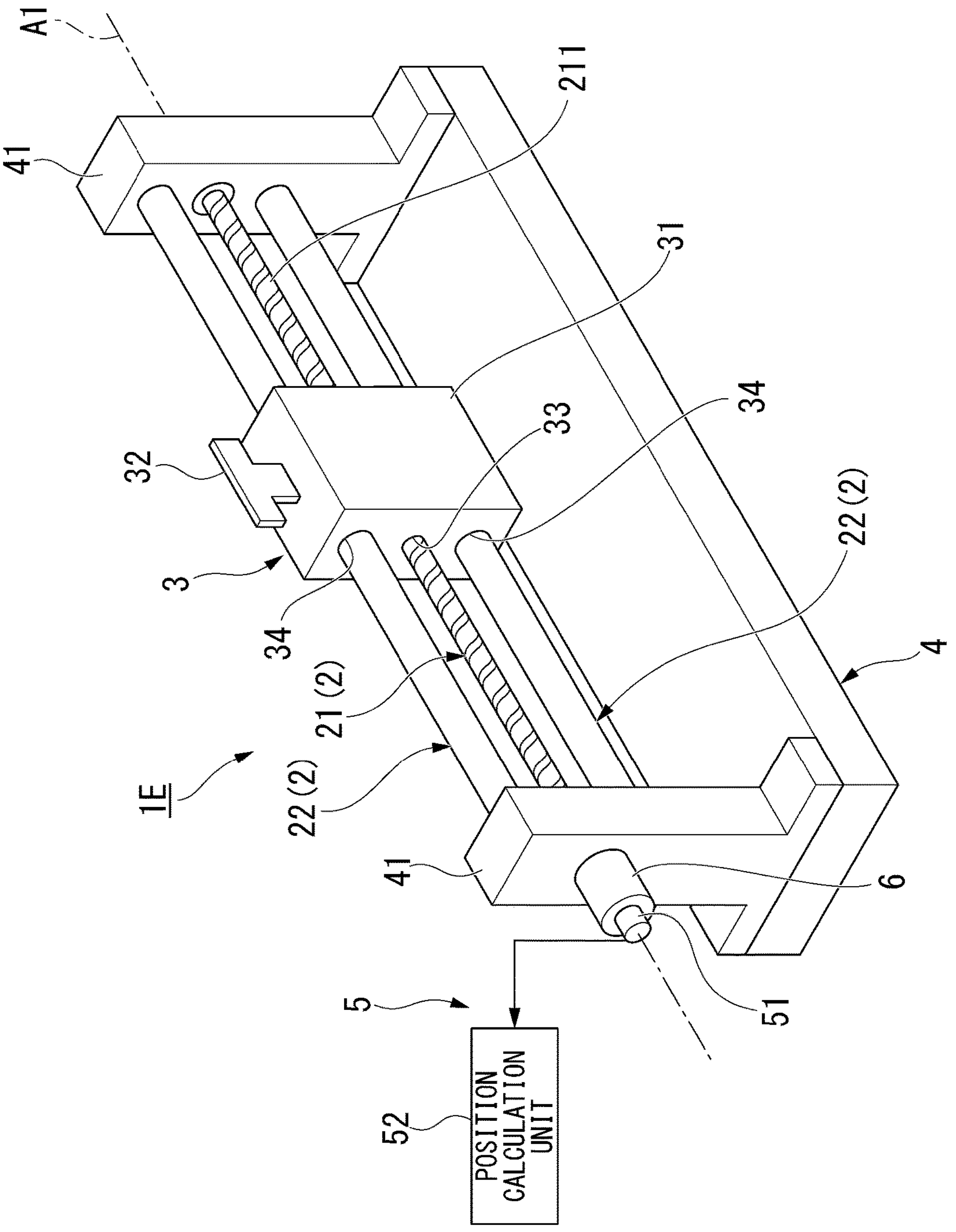
FIG. 4 is a perspective view showing a fader device according to the second embodiment of the present disclosure.
Figure 5:
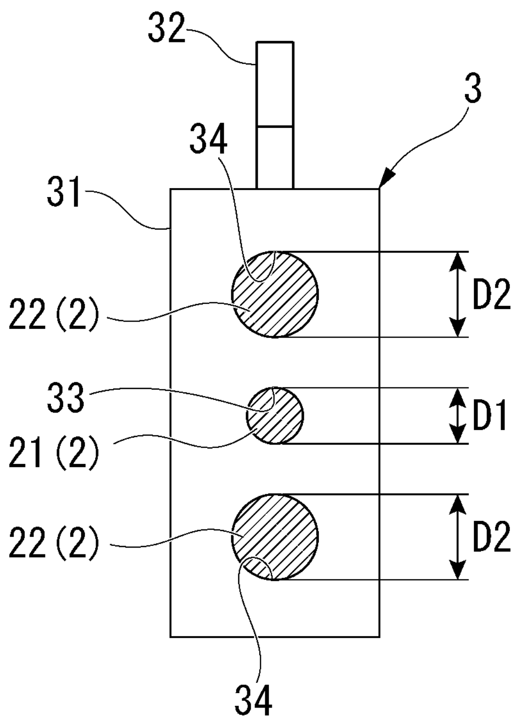
FIG. 5 is a sectional view showing the relationship between the screw shaft, the guide shaft and the moving body in the fader device of FIG. 4.

As shown in FIG. 4, a fader device 1E according to the second embodiment includes a plurality of shafts 2, a moving body 3, and a base 4, as in the first embodiment. The plurality of shafts 2 include a screw shaft 21 and guide shafts 22 similar to those in the first embodiment.

However, the fader device 1E of the second embodiment has a plurality of guide shafts 22. As shown in FIG. 5, the plurality of guide shafts 22 are arranged so as to surround the screw shaft 21 when viewed from the longitudinal direction of the shafts 2. For example, the plurality of guide shafts 22 may be arranged at regular intervals in the circumferential direction around the screw shaft 21 when viewed from the longitudinal direction of the shafts 2.

The number of guide shafts 22 in the second embodiment is two. The two guide shafts 22 are equally spaced (180 degrees apart) in the circumferential direction around the screw shaft 21 when viewed from the longitudinal direction of the shafts 2. Therefore, the screw shaft 21 is positioned between the two guide shafts 22 when viewed in the longitudinal direction of the shafts 2. That is, the screw shaft 21 and the two guide shafts 22 are arranged in a row in a direction orthogonal to the longitudinal direction of the shafts 2. In particular, in the present embodiment, the operation portion 32, the screw shaft 21, and the two guide shafts 22 are arranged in a row in the direction perpendicular to the longitudinal direction of the shafts 2 (vertical direction in FIG. 5). As a result, the width dimension of the fader device 1E in the left-right direction in FIG. can be kept small.

According to the fader device 1E of the second embodiment, the same effects as those of the first embodiment are achieved.

Further, in the fader device 1E of the second embodiment, the plurality of guide shafts 22 are arranged so as to surround the screw shaft 21 when viewed from the longitudinal direction of the shafts 2. Therefore, the load when the operator manually moves the moving body 3 is more likely to act on the multiple guide shafts 22. As a result, the load acting on the screw shaft 21 can be reduced. Therefore, it is possible to form the screw shaft 21 thinner. Thereby, the friction generated between the screw shaft 21 and the moving body 3 can be further suppressed. Accordingly, the resistance when moving the moving body 3 manually can be further reduced, and the operational feeling of the moving body 3 can be further improved.

Figure 6:
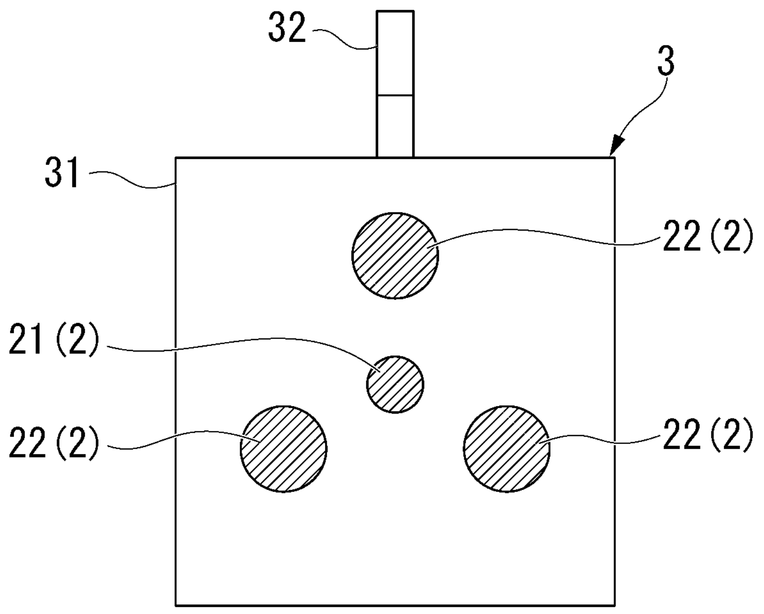
FIG. 6 is a sectional view showing a modification of the fader device of FIGS. 4 and 5.

In the fader device 1E of the second embodiment, the number of the guide shafts 22 may be three or more. In this case, three or more guide shafts 22 may be arranged at regular intervals in the circumferential direction around the screw shaft 21 when viewed from the longitudinal direction of the shafts 2, as illustrated in FIG. 6. However, in this case, the width dimension of the fader device 1 in the horizontal direction tends to increase. For this reason, three or more guide shafts 22 may be arranged at uneven intervals in the circumferential direction around the screw shaft 21 so that the width dimension of the fader device 1 is reduced, for example.

In the fader devices of the first and second embodiments, the guide shaft 22 is not limited to being inserted through the second through hole 34 of the moving body 3, and for example may be provided to support the moving body 3 (main body portion 31) from the outside thereof.

In the fader devices of the first and second embodiments, the position measuring unit 5 that measures the position of the moving body 3 is not limited to the configuration that measures the position of the moving body 3 based on the rotational position of the screw shaft 21, but may also be configured to directly measure the position of the moving body 3, for example.

Third Embodiment

Next, a third embodiment of the present disclosure will be described with reference to FIGS. 7 to 12. In the following description, the same reference numerals are given to the same configurations as those already described, and redundant descriptions will be omitted.

Figure 7:
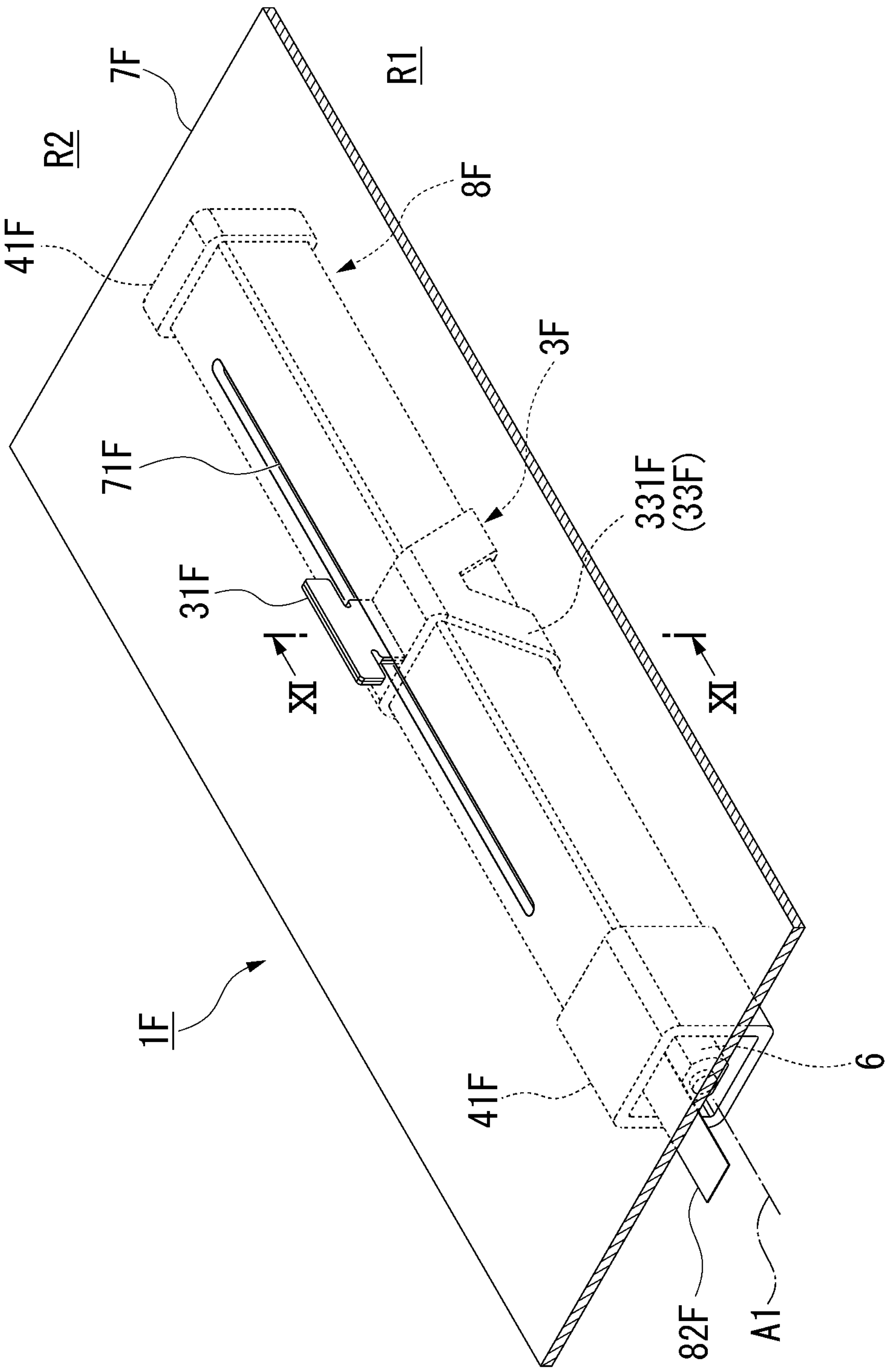
FIG. 7 is a perspective view showing a fader device according to the third embodiment of the present disclosure.
Figure 8:
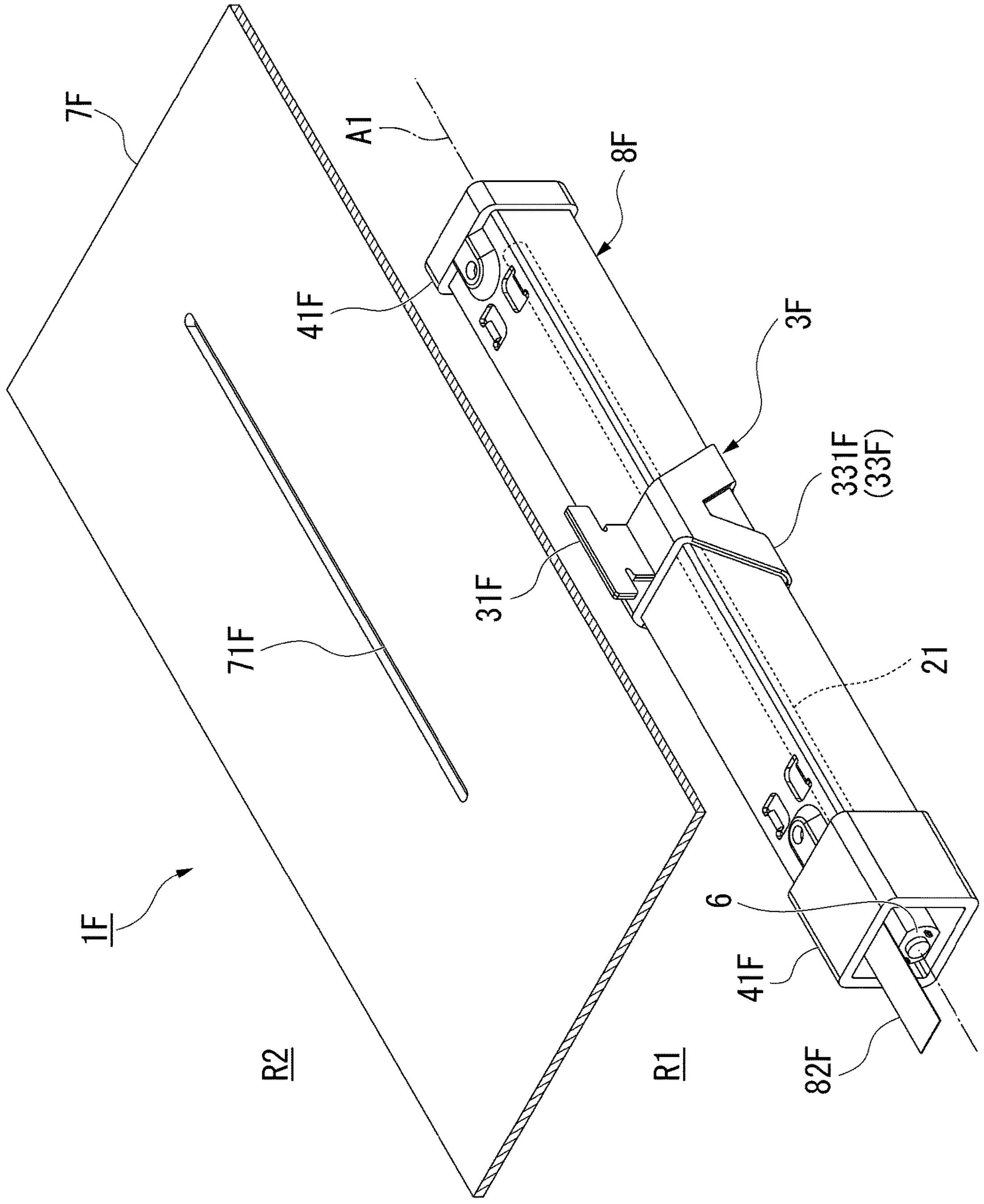
FIG. 8 is a perspective view showing a state in which the partition member is removed in the fader device of FIG. 7.

As shown in FIGS. 7 and 8, a fader device 1F according to the third embodiment includes a screw shaft 21, a moving body 3F, a partition member 7F, and a cover member 8F. Further, the fader device 1F further includes a pair of support portions 41F and a motor 6.

Figure 9:
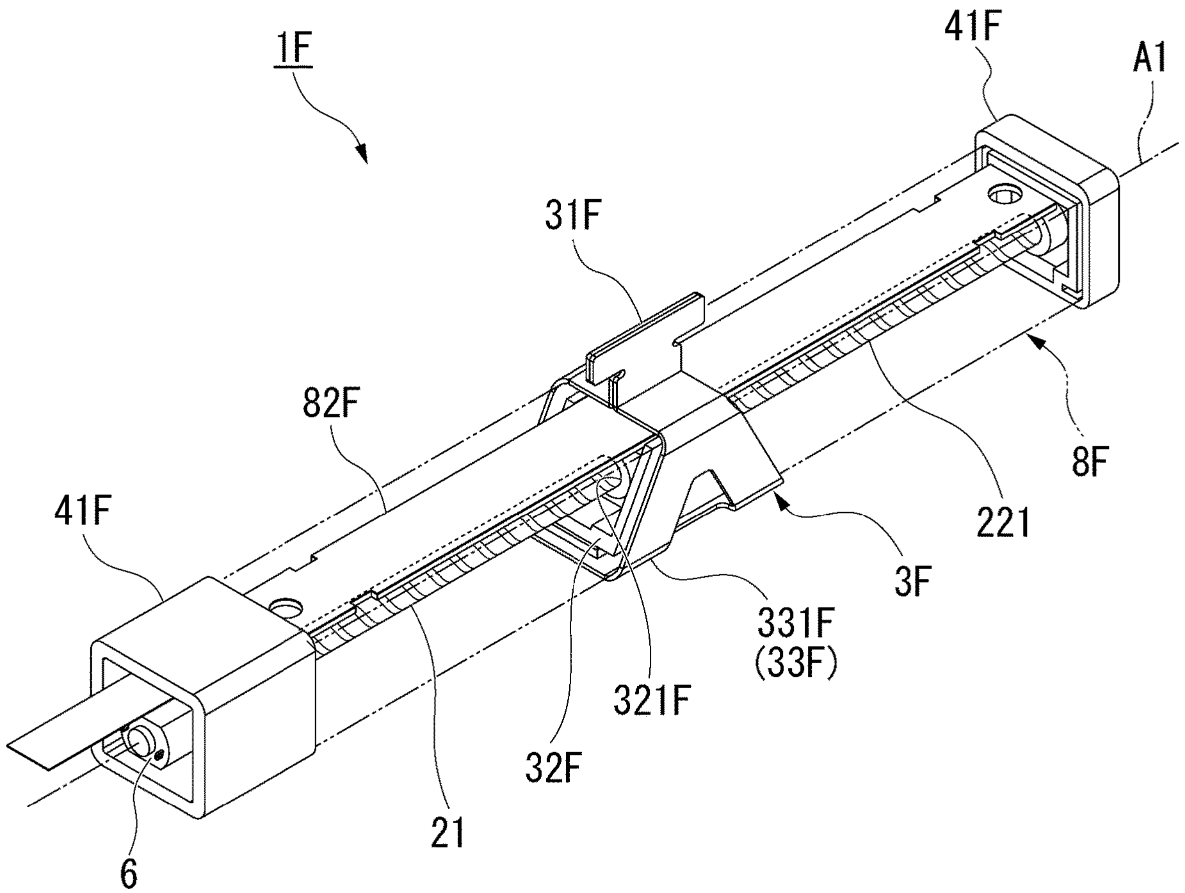
FIG. 9 is a perspective view showing a state in which a cover member is removed from the fader device of FIG. 8.
Figure 10:
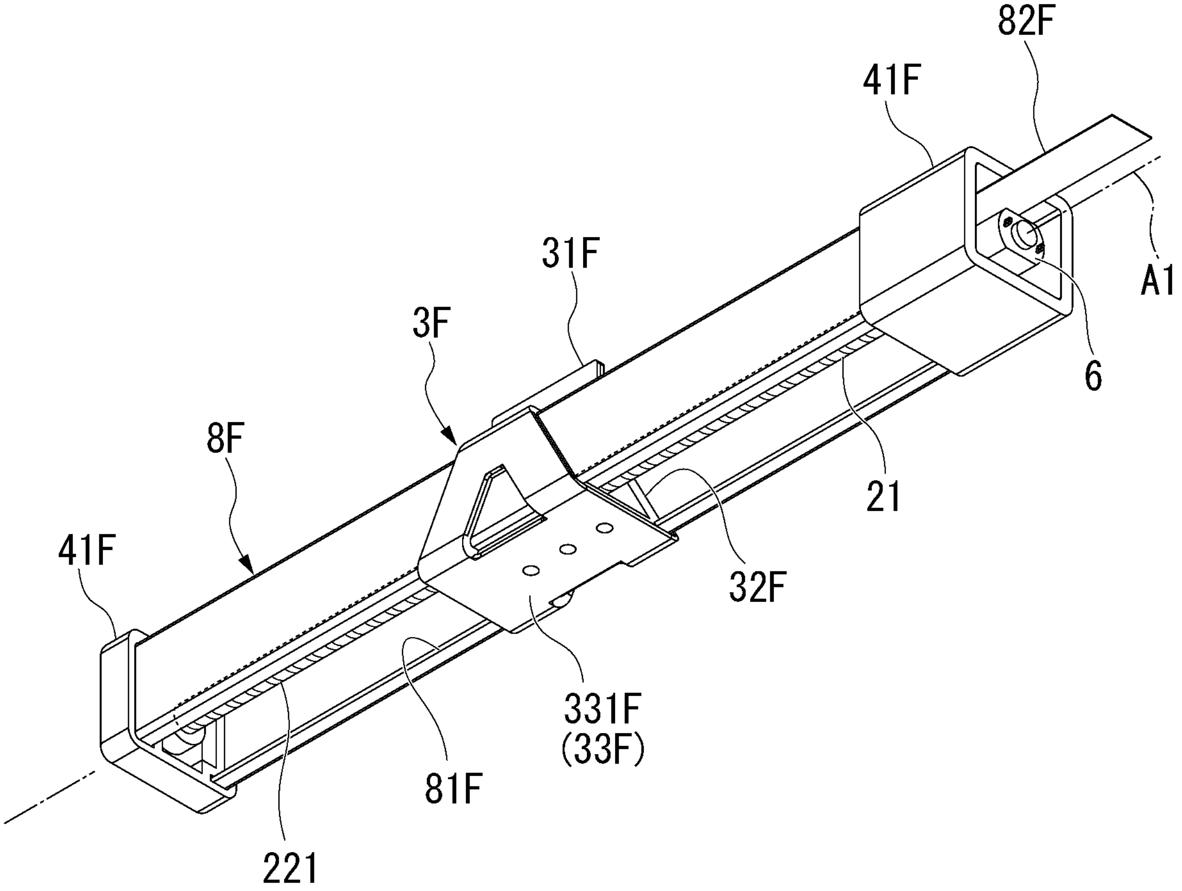
FIG. 10 is a perspective view of the fader device of FIG. 8 viewed from a different angle.

The screw shaft 21 shown in FIGS. 8 to 10 is formed in a rod shape extending in a straight line and has a male thread 211 on the outer circumference thereof, as in the first and second embodiments. Both end portions of the screw shaft 21 in the longitudinal direction are supported by the pair of support portions 41F so that the screw shaft 21 can rotate about the axis A1.

The motor 6 rotationally drives the screw shaft 21 as in the first and second embodiments. The motor 6 is attached to one support portion 41F.

The moving body 3F is attached to the screw shaft 21 as in the first and second embodiments. Further, the moving body 3F is configured to mesh with the male thread 211 of the screw shaft 21 so as to move in the longitudinal direction (linear direction) of the screw shaft 21 as the screw shaft 21 rotates. Although not shown, the aspect of the moving body 3F that engages with the male thread 211 of the screw shaft 21 may be the same as that of the first embodiment (for example, the engaging portion 35 illustrated in FIG. 3).

A specific configuration of the moving body 3F will be described later.

Figure 11:
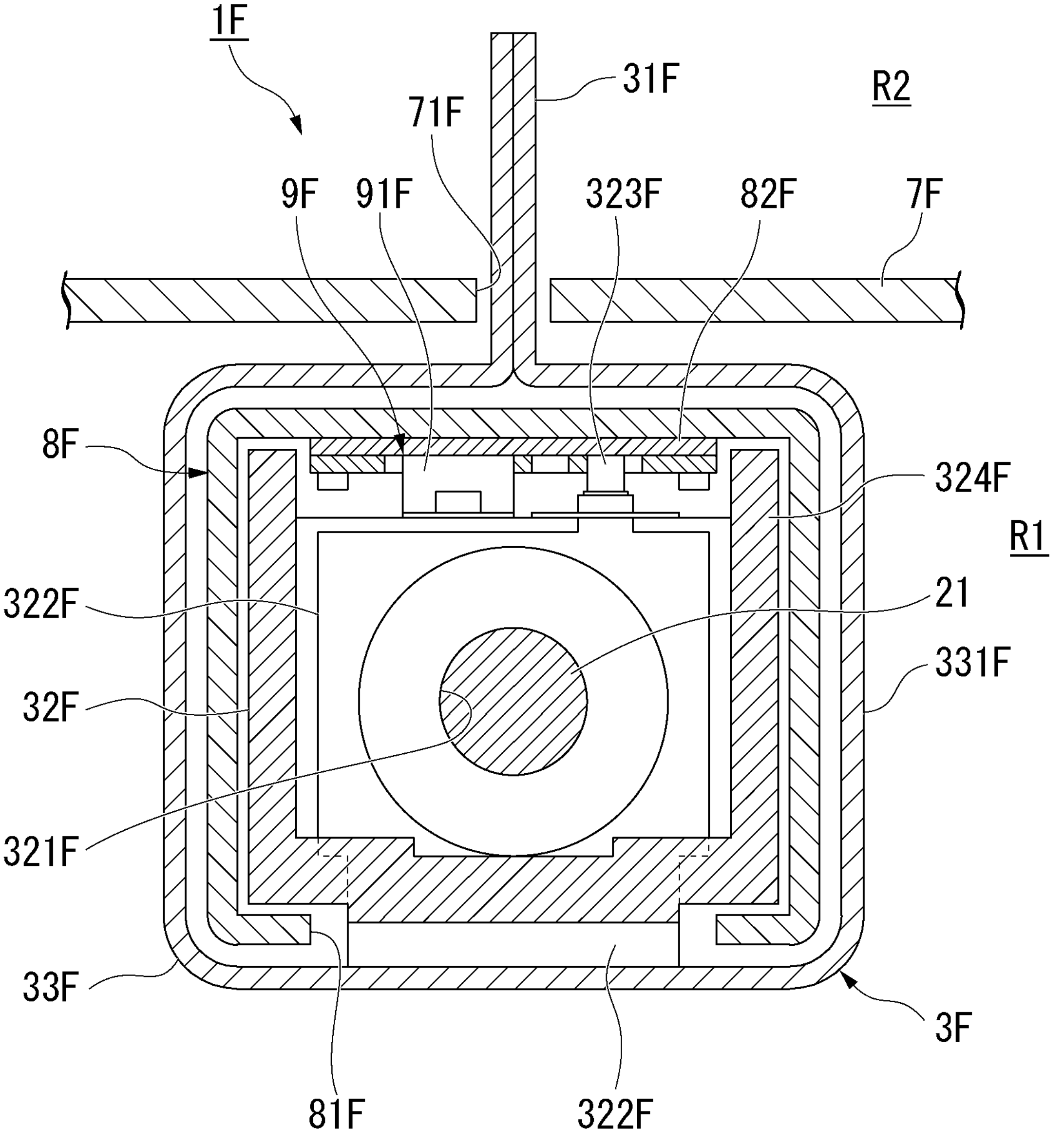
FIG. 11 is a cross-sectional view taken along line XI-XI in FIG. 7.

As shown in FIGS. 7, 8 and 11, the partition member 7F forms a partition into a first region R1 where the screw shaft 21 is arranged and a second region R2 different from the first region R1. The partition member 7F has an insertion hole (slot) 71F through which a portion of the moving body 3F attached to the screw shaft 21 is inserted from the first region R1 side to the second region R2 side. The insertion hole 71F extends in the longitudinal direction of the screw shaft 21 (that is, the moving direction of the moving body 3F). Although the partition member 7F of the present embodiment is a panel member formed in a flat plate shape, it is not limited thereto.

In the following description, the direction perpendicular to the longitudinal direction of the screw shaft 21 and in which the first region R1 and the second region R2 partitioned by the partition member 7F are aligned is sometimes called the vertical direction. In addition, in the vertical direction, the side of the first region R1 may be called the lower side or below, and the side of the second region R2 is sometimes called the upper side or above. Also, as shown in FIG. 11, the direction perpendicular to the vertical direction when viewed from the longitudinal direction of the screw shaft 21 is sometimes called the left-right direction.

As shown in FIG. 11, the insertion hole 71F of the partition member 7F is positioned so as to overlap the screw shaft 21 when viewed from the vertical direction. That is, the insertion hole 71F is positioned so as not to shift in the left-right direction with respect to the screw shaft 21. Note that the insertion hole 71F may be shifted in the left-right direction with respect to the screw shaft 21, for example.

The cover member 8F is positioned in the first region R1 between the screw shaft 21 and the insertion hole 71F of the partition member 7F. As shown in FIGS. 7 and 8, the cover member 8F extends in the longitudinal direction of the screw shaft 21 and the insertion hole 71F of the partition member 7F between the screw shaft 21 and the insertion hole 71F. The extending direction of the cover member 8F is parallel to the longitudinal direction of the screw shaft 21.

As shown in FIGS. 8 to 11, the cover member 8F is formed in a tubular shape extending in the longitudinal direction of the screw shaft 21. The tubular cover member 8F surrounds the screw shaft 21. Both longitudinal end portions of the cover member 8F are fixed to the pair of support portions 41F. Thereby, the relative positions of the cover member 8F and the screw shaft 21 are fixed.

The cover member 8F may have a cylindrical shape, but in the present embodiment has a polygonal tubular shape. Specifically, the cover member 8F is formed in a rectangular tubular shape having vertical sides extending in the vertical direction and horizontal sides extending in the horizontal direction.

As shown in FIGS. 10 and 11, the cover member 8F has a long hole (elongated opening, opening) 81F (coupling hole) extending in the longitudinal direction thereof. The long hole 81F of the cover member 8F connects the inner side and the outer side of the cylindrical cover member 8F. The long hole 81F is not located between the screw shaft 21 and the insertion hole 71F of the partition member 7F when viewed from the longitudinal direction of the screw shaft 21 as shown in FIG. 11. That is, the long hole 81F is located outside the region between the screw shaft 21 and the insertion hole 71F of the partition member 7F. Since the long hole 81F is positioned in this way, the screw shaft 21 cannot be seen from the second region R2 side through the insertion hole 71F of the partition member 7F and the long hole 81F of the cover member 8F.

Specifically, the long hole 81F faces the opposite side (downward) to the partition member 7F. Note that the long hole 81F of the cover member 8F may face, for example, in the left-right direction, or may face towards the partition member 7F side (upper side).

A specific configuration of the moving body 3F will be described below.

As shown in FIGS. 9 to 12, the moving body 3F includes an insertion portion 31F, a mounting portion 32F, and a coupling portion 33F. The mounting portion 32F and the coupling portion 33F are positioned on the side of the first region R1 side partitioned by the partition member 7F, and the insertion portion 31F is inserted through the insertion hole 71F of the partition member 7F. As a result, part of the insertion portion 31F is positioned on the second region R2 side. The portion of the insertion portion 31F positioned on the second region R2 side functions as the operation portion that is touched by the fingers of the operator of the fader device 1F in order to manually move the moving body 3F.

The mounting portion 32F of the moving body 3F is a portion that meshes with the male thread 211 of the screw shaft 21, and has an engaging portion that engages with the male thread 211, similar to the main body portion 31 of the moving body 3 of the first embodiment. Specifically, the mounting portion 32F of the moving body 3F has a through hole 321F through which the screw shaft 21 is inserted. Although not shown, the engaging portion of the mounting portion 32F is a female thread formed on the inner periphery of the through hole 321F of the mounting portion 32F.

As shown in FIG. 11, the cover member 8F is interposed between the mounting portion 32F and the insertion portion 31F. In the present embodiment, the mounting portion 32F is positioned below the insertion portion 31F with a space therebetween, and the cover member 8F is interposed between the insertion portion 31F and the mounting portion 32F which are vertically aligned.

In addition, the mounting portion 32F is arranged inside the tubular cover member 8F together with the screw shaft 21. The mounting portion 32F is exposed to the outside of the cover member 8F through the long hole 81F of the cover member 8F that opens downward.

The external shape of the mounting portion 32F viewed from the longitudinal direction of the screw shaft 21 corresponds to the shape of the inner periphery of the cylindrical cover member 8F. That is, the external shape of the mounting portion 32F when viewed from the longitudinal direction of the screw shaft 21 is formed in a rectangular shape (polygonal shape) generally corresponding to the shape of the inner periphery of the cover member 8F. In addition, the size of the mounting portion 32F when viewed from the longitudinal direction of the screw shaft 21 is slightly smaller than the size of the inner circumference of the cover member 8F. Accordingly, the mounting portion 32F is locked to the cover member 8F in the rotation direction of the screw shaft 21. That is, the cover member 8F prevents the mounting portion 32F from rotating together with the screw shaft 21.

As shown in FIGS. 9 to 12, the coupling portion 33F couples the above-mentioned insertion portion 31F and the mounting portion 32F. As described above, the cover member 8F is interposed between the insertion portion 31F and the mounting portion 32F. Therefore, the coupling portion 33F is formed so as to bypass the cover member 8F when viewed from the longitudinal direction of the screw shaft 21, as shown in FIG. 11. That is, the coupling portion 33F is formed to extend in the left-right direction with respect to the insertion portion 31F and the mounting portion 32F so as not to be positioned between the insertion hole 71F of the partition member 7F and the cover member 8F when viewed from the longitudinal direction of the screw shaft 21. In other words, the coupling portion 33F surrounds the cover member 8F.

The coupling portion 33F couples the insertion portion 31F and the mounting portion 32F by being inserted through the long hole 81F of the cover member 8F. That is, the long hole 81F of the cover member 8F functions as a coupling hole that couples the insertion portion 31F and the mounting portion 32F.

Figure 12:
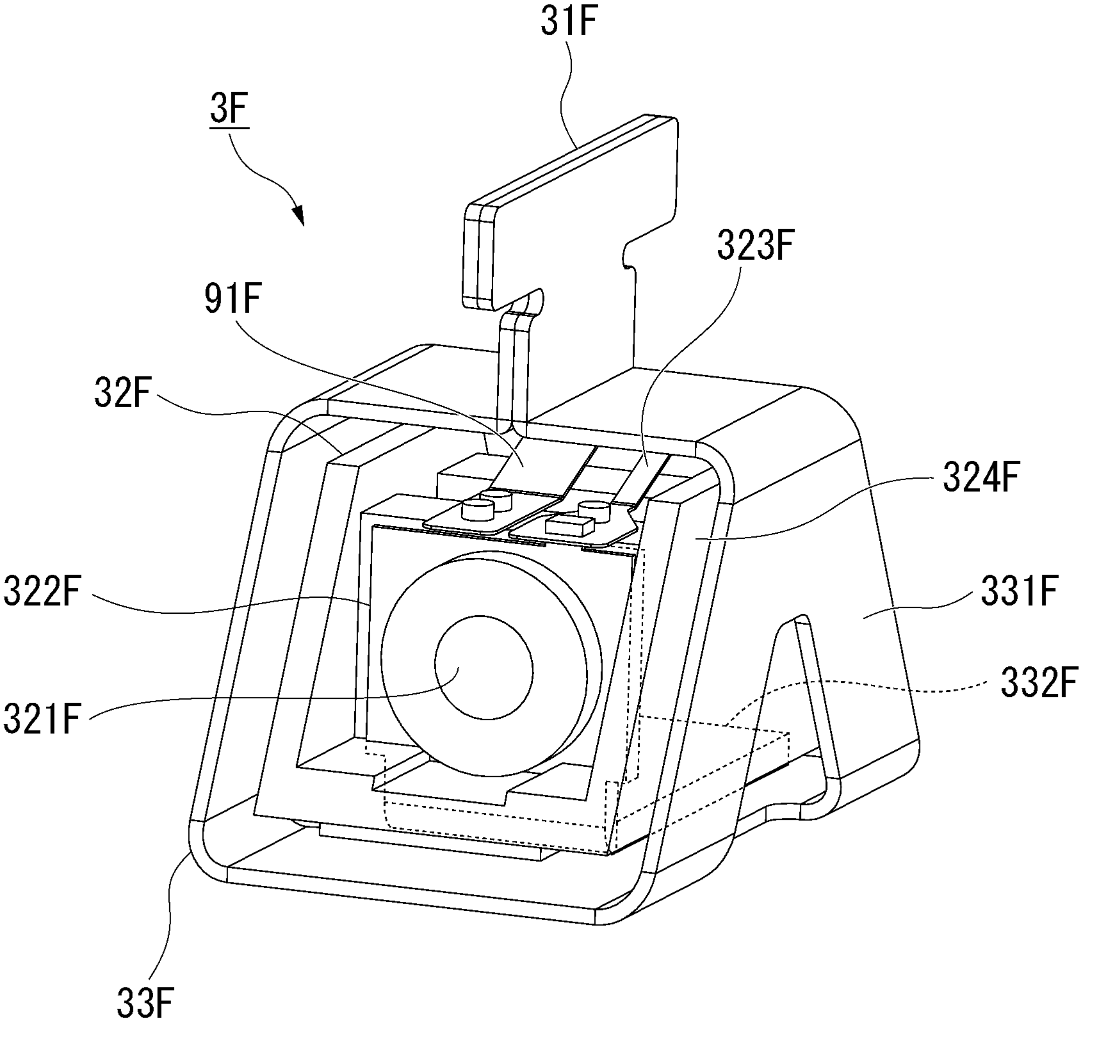
FIG. 12 is a perspective view showing the moving body in the fader device of FIGS. 7 to 11.

As shown in FIGS. 11 and 12, the coupling portion 33F has an annular portion (annular portion) 331F that surrounds the outer side of the mounting portion 32F when viewed from the longitudinal direction of the screw shaft 21. The insertion portion 31F is connected to the upper end of the annular portion 331F. Further, the lower end of the annular portion 331F is connected to the insertion portion of the coupling portion 33F that passes through the long hole 81F of the cover member 8F and that is connected to the mounting portion 32F. The insertion portion 31F extends above the annular portion 331F in the middle in the left-right direction of the annular portion 331F. The insertion portion of the coupling portion 33F extends upward from the inner surface of the annular portion 331F facing upward in the middle of the annular portion 331F in the left-right direction.

As shown in FIGS. 8 to 11, the screw shaft 21 and the cover member 8F are inserted through the annular portion 331F. The annular portion 331F is locked to the cover member 8F in the rotation direction of the screw shaft 21. This point will be described below.

As shown in FIG. 11, the shape of the annular portion 331F viewed from the longitudinal direction of the screw shaft 21 corresponds to the shape of the outer periphery of the cover member 8F. That is, the shape of the annular portion 331F viewed from the longitudinal direction of the screw shaft 21 is formed in a rectangular shape (polygonal shape) corresponding to the shape of the outer periphery of the cover member 8F. Also, the size of the annular portion 331F when viewed from the longitudinal direction of the screw shaft 21 is slightly larger than the size of the outer periphery of the cover member 8F. Thereby, the annular portion 331F is locked to the cover member 8F in the rotation direction of the screw shaft 21. That is, the cover member 8F prevents the annular portion 331F from rotating together with the screw shaft 21.

The moving body 3F configured as described above is attached to both the screw shaft 21 and the cover member 8F so as to be movable in the longitudinal direction of the screw shaft 21.

In the moving body 3F of the present embodiment, the insertion portion 31F and the mounting portion 32F are electrically connected via the coupling portion 33F. This point will be described below.

In the moving body 3F of this embodiment shown in FIGS. 11 and 12, the insertion portion 31F and the annular portion 331F of the coupling portion 33F are integrally formed of an electrically conductive member such as metal. A part of the mounting portion 32F and the insertion portion of the coupling portion 33F passing through the long hole 81F of the cover member 8F are formed by a conductive member 322F having electrical conductivity such as metal. The conductive member 322F is connected to the conductive annular portion 331F. Thereby, the insertion portion 31F and the mounting portion 32F are electrically connected. Note that the mounting portion 32F also has a connection terminal 323F that is connected to the conductive member 322F and extends to a substrate 82F, which will be described later.

The specific aspect of the conductive member 322F may be arbitrary. The conductive member 322F of the present embodiment is formed by bending a plate material. Also, the conductive member 322F is sealed in a resin molded portion 324F that forms the outer shape of the mounting portion 32F.

In the fader device 1F of the present embodiment, the structure electrically connecting the insertion portion 31F and the mounting portion 32F is used for a touch sensor to detect whether the operator of the fader device 1F touches the moving body 3F (insertion portion 31F). This point will be described below.

As shown in FIGS. 9 and 11, the substrate 82F extending in the longitudinal direction of the screw shaft 21 is provided on the surface of the cover member 8F facing the mounting portion 32F. Although not shown, the substrate 82F is formed with connection wiring extending in the longitudinal direction of the screw shaft 21 and electrically connected to the connection terminal 323F of the mounting portion 32F. This connection wiring is connected to an electric circuit (contact detection circuit; not shown) for detecting contact of the operator's fingers with the insertion portion 31F of the moving body 3F. The contact detection circuit detects whether or not there is contact with the insertion portion 31F based on an electrical change (for example, a change in capacitance).

The fader device 1F of the present embodiment further includes a position detection unit 9F that detects the position of the moving body 3F in the longitudinal direction of the screw shaft 21. The position detection unit 9F has a resistor (not shown) and a resistive element 91F made of conductors. The resistor is provided on the cover member 8F. In the present embodiment, the resistor is electrical wiring, not shown, formed on the substrate 82F described above. The resistive element 91F is provided on the moving body 3F and contacts the resistor provided on the cover member 8F. In the present embodiment, the resistive element 91F is provided on the mounting portion 32F of the moving body 3F. The resistive element 91F is electrically insulated from the conductive member 322F and the connection terminal 323F described above. As the resistive element 91F moves in the longitudinal direction of the screw shaft 21 together with the moving body 3F, the resistor can detect the position of the resistive element 91F in the longitudinal direction of the screw shaft 21.

As shown in FIG. 11, the substrate 82F including the connection wiring for the touch sensor and the resistor for the position detection unit 9F is provided on a surface of the cover member 8F facing the screw shaft 21. In the present embodiment, the substrate 82F is provided on the inner surface of the cylindrical cover member 8F. Further, the substrate 82F is arranged on the surface of the cover member 8F facing the opposite side (downward) of the partition member 7F.

The substrate 82F is fixed to the cover member 8F. The method for fixing the substrate 82F to the cover member 8F may be any method such as caulking, screwing, or adhesion.

In the fader device 1F of the third embodiment, similarly to the first and second embodiments, the moving body 3F can be moved in the longitudinal direction of the screw shaft 21 by rotationally driving the screw shaft 21 with the motor 6. On the other hand, when the operator grabs the moving body 3F (operation portion) and manually moves it in the longitudinal direction of the screw shaft 21, the screw shaft 21 rotates.

According to the fader device 1F of the third embodiment, the same effects as those of the first and second embodiments are obtained.

Further, in the fader device 1F of the third embodiment, the cover member 8F is interposed between the screw shaft 21 and the insertion hole 71F of the partition member 7F in the first region R1 where the screw shaft 21 is arranged. Therefore, even if dust enters the first region R1 through the insertion hole 71F of the partition member 7F from the second region R2, the dust can be prevented from reaching the screw shaft 21 by the cover member 8F. That is, it becomes difficult for dust to adhere to the male thread 211 of the screw shaft 21. As a result, the operation of the screw shaft 21 and the moving body 3F (for example, the movement of the moving body 3F accompanying the rotation of the screw shaft 21) can be effectively prevented from being hindered by dust.

Further, in the fader device 1F of the third embodiment, the moving body 3F includes the insertion portion 31F inserted through the insertion hole 71F of the partition member 7F, the mounting portion 32F that meshes with the male thread 211 of the screw shaft 21, and the coupling portion 33F that couples the insertion portion 31F and the mounting portion 32F. The coupling portion 33F is formed so as to bypass the cover member 8F interposed between the insertion portion 31F and the mounting portion 32F. As a result, even if the cover member 8F is interposed between the screw shaft 21 and the insertion hole 71F of the partition member 7F, the moving body 3F attached to the screw shaft 21 on the first region R1 side can be passed through the insertion hole 71F of the partition member 7F.

Further, the coupling portion 33F is formed so as to bypass the cover member 8F when viewed from the longitudinal direction of the screw shaft 21. Therefore, the coupling portion 33F does not hinder the movement of the moving body 3F in the longitudinal direction of the screw shaft 21.

Further, in the fader device 1F of the third embodiment, the long hole 81F (coupling hole) of the cover member 8F, which extends in the longitudinal direction of the screw shaft 21 and through which the coupling portion 33F is inserted, is located outside the region between the screw shaft 21 and the insertion hole 71F of the partition member 7F, viewed from the longitudinal direction of the screw shaft 21. That is, the long hole 81F of the cover member 8F is not positioned between the screw shaft 21 and the insertion hole 71F of the partition member 7F. For this reason, even if dust enters the first region R1 through the insertion hole 71F of the partition member 7F from the second region R2, the dust can effectively be prevented from reaching the screw shaft 21 through the coupling hole of the cover member 8F. In addition, since the long hole 81F of the cover member 8F faces the side opposite to the partition member 7F, it is possible to further prevent the dust from reaching the screw shaft 21. As a result, it is possible to more effectively prevent dust from adhering to the male thread 211 of the screw shaft 21.

In addition, in the fader device 1F of the third embodiment, the annular portion 331F of the coupling portion 33F through which the cover member 8F is inserted is locked to the cover member 8F in the rotational direction of the screw shaft 21. Therefore, it is possible to prevent the moving body 3F from rotating around the axis A1 of the screw shaft 21. That is, the position of the moving body 3F in the rotation direction of the screw shaft 21 can be maintained. In other words, the cover member 8F functions as a guide member that guides the moving body 3F in the longitudinal direction of the screw shaft 21 while maintaining the orientation of the moving body 3F.

Here, in the fader device 1F of the third embodiment, the mounting portion 32F of the moving body 3F is also locked to the cover member 8F in the rotational direction of the screw shaft 21, as with the annular portion 331F. That is, the mounting portion 32F that is locked to the cover member 8F can also prevent the moving body 3F from rotating about the axis A1 of the screw shaft 21.

Further, in the fader device 1F of the third embodiment, the insertion portion 31F of the moving body 3F and the mounting portion 32F are electrically connected via the coupling portion 33F. Accordingly, the moving body 3F can be used for a touch sensor that detects whether or not the operator touches the moving body 3F (operation portion).

Further, in the fader device 1F of the third embodiment, the connection wiring for the touch sensor and the resistor for the position detection unit 9F provided on the substrate 82F are arranged on the surface of the cover member 8F facing the screw shaft 21. For this reason, even if dust enters the first region R1 from the second region R2 through the insertion hole 71F of the partition member 7F, the cover member 8F can prevent the dust from reaching the connection wiring and the resistor (substrate 82F). That is, it becomes difficult for dust to adhere to the connection wiring and the resistor. As a result, it is possible to prevent the touch sensor and the position detection unit 9 from malfunctioning due to dust.

In the third embodiment, the structure of the coupling portion 33F for bypassing the cover member 8F is not limited to the annular portion 331F (a structure formed in an O shape when viewed from the longitudinal direction of the screw shaft 21). The structure of the coupling portion 33F for bypassing the cover member 8F may be, for example, a C-shaped or L-shaped structure when viewed from the longitudinal direction of the screw shaft 21.

Even if the structure of the coupling portion 33F that bypasses the cover member 8F has a C-shaped or L-shaped structure, the coupling portion 33F can be locked to the long hole 81F of the cover member 8F in the rotational direction of the screw shaft 21 if the coupling portion 33F bypasses the cover member 8F and passes through the long hole 81F of the cover member 8F facing away from the partition member 7F. That is, it is possible to prevent the moving body 3F from rotating around the axis A1 of the screw shaft 21.

In the third embodiment, the cover member 8F is not limited to a tubular shape, and may be formed in a plate shape, for example. The plate-shaped cover member 8F may be arranged, for example, such that the thickness direction of the cover member 8F coincides with the direction (vertical direction) in which the partition member 7F and the screw shaft 21 are arranged. Further, a long hole 81F (coupling hole) through which the coupling portion 33F of the moving body 3F passes may be formed in the plate-shaped cover member 8F, as in the above-described third embodiment. The long hole 81F formed in the plate-shaped cover member 8F may be positioned outside the region between the screw shaft 21 and the insertion hole 71F of the partition member 7F when viewed from the longitudinal direction of the screw shaft 21. For example, the long hole 81F of the cover member 8F may be positioned laterally offset from the screw shaft 21. Thereby, even if dust enters the first region R1 through the insertion hole 71F of the partition member 7F from the second region R2, the dust can be prevented from reaching the screw shaft 21 through the long hole 81F of the cover member 8F.

Although the present disclosure has been described in detail above, the present disclosure is not limited to the above embodiments, and various modifications can be made without departing from the scope of the present disclosure.

In the fader device of the present disclosure, the engaging portion 35 of the moving body 3, 3F is not limited to the female thread 351, but may be an engaging projection that enters and engages with the groove of the male thread 211. Also, the engaging portion 35 of the moving body 3 and 3F may be a component that constitutes a ball screw together with the screw shaft 21, for example.

In the fader device of the present disclosure, the screw shaft 21 is not limited to being inserted through the through hole 33, 321F of the moving body 3, 3F, and may for example be provided so as to mesh with the outer surface of the moving body 3, 3F (the main body 31 in the first and second embodiments, and the mounting portion 32F in the third embodiment). In this case, the engaging portion 35 of the moving body 3 and 3F may be an engaging protrusion that protrudes from the outer surface of the main body portion 31 and the mounting portion 32F to engage with the male thread 211, for example.

The fader device of the present disclosure may include a plurality of screw shafts 21, for example. That is, by rotating a plurality of the screw shafts 21, one moving body 3, 3F may move in the longitudinal direction of the shafts 2 or the screw shafts 21.

In the fader device of the present disclosure, the screw of the screw shaft 21 that meshes with the moving body 3 and 3F is not limited to the male thread, and may be, for example, a female thread.

According to this disclosure, a moving body can be precisely moved by a motor or other means while improving the operational feeling of the moving body.

What is claimed is:

1. A fader device comprising:

a screw shaft extending in a linear direction and including a male thread on an outer periphery thereof, the screw shaft being rotatably supported so that the screw shaft is rotatable about an axis thereof extending in the linear direction;

a moving body attached to the screw shaft and meshes with the male thread to move in the linear direction as the screw shaft rotates, the moving body including:

an insertion portion;

a mounting portion that meshes with the male thread; and a coupling portion that couples the insertion portion and the mounting portion;

a partition member that separates a first region where the screw shaft is located from a second region that is different from the first region, the partition member including a slot that extends in the linear direction and through which the insertion portion of the moving body extends through from a side of the first region to a side of the second region; and a cover member positioned between the screw shaft and the slot of the partition member in the first region and extending in the linear direction, wherein the cover member is interposed between the insertion portion and the mounting portion, and wherein the coupling portion surrounds the cover member as viewed in the linear direction.

2. The fader device according to claim 1, wherein:

the cover member includes a coupling hole that extends in the linear direction and couples the insertion portion and the mounting portion by the coupling portion extending through the coupling hole, and the coupling hole is positioned outside a region between the screw shaft and the slot as viewed in the linear direction.

3. The fader device according to claim 1, wherein:

the coupling portion includes a tubular portion surrounding an outer side of the mounting portion as viewed in the linear direction, the tubular portion surrounds the screw shaft and the cover member, and the tubular portion and the cover member are configured to be not rotatable relative to each other.

4. The fader device according to claim 1, wherein the insertion portion and the mounting portion are electrically connected via the coupling portion.

5. A fader device comprising:

a screw shaft extending in a linear direction and including a male thread on an outer periphery thereof, the screw shaft being rotatably supported so that the screw shaft is rotatable about an axis thereof extending in the linear direction;

a moving body attached to the screw shaft and meshes with the male thread to move in the linear direction as the screw shaft rotates;

a partition member that separates a first region where the screw shaft is located from a second region that is different from the first region, the partition member including a slot that extends in the linear direction and through which part of the moving body extends through from a side of the first region to a side of the second region; and a cover member positioned between the screw shaft and the slot of the partition member in the first region and extending in the linear direction, wherein the cover member:

is tubular shaped surrounding the screw shaft and the mounting portion;

includes an elongated opening extending in the linear direction and connecting an inside and an outside of the cover member, the elongated opening facing an opposite side of the partition member.

* * * * *